(12) United States Patent  (10) Patent No.: US 8,719,372 B2
Sattari et al.  (45) Date of Patent: May 6, 2014

(54) SYSTEMS AND METHODS FOR REAL-TIME VIEWING AND MANIPULATION OF INFORMATION HOSTED ON THIRD-PARTY SYSTEMS, INCLUDING METRICS, FALSE ACKNOWLEDGEMENTS, AND AUTO-COMPLETION FOR INPUTTING INFORMATION OVER A NETWORK

(71) Applicants: Comron Sattari, Cupertino, CA (US); Tushar Ranka, Ventura, CA (US); Donald Tognazzini, Santa Barbara, CA (US); Rajesh Kumar, Chicago, IL (US)

(72) Inventors: Comron Sattari, Cupertino, CA (US); Tushar Ranka, Ventura, CA (US); Donald Tognazzini, Santa Barbara, CA (US); Rajesh Kumar, Chicago, IL (US)

(73) Assignee: AppFolio, Inc., Goleta, CA (US)

( * ) Notice: Subject to any disclaimer, the term of this patent is extended or adjusted under 35 U.S.C. 154(b) by 16 days.

(21) Appl. No.: 13/658,157

(22) Filed: Oct. 23, 2012

(65) Prior Publication Data

US 2013/0047269 A1 Feb. 21, 2013

Related U.S. Application Data

(62) Division of application No. 12/637,103, filed on Dec. 14, 2009, now Pat. No. 8,341,206.

(51) Int. Cl.
 *G06F 15/16* (2006.01)
(52) U.S. Cl.
 USPC .......................................................... 709/217
(58) Field of Classification Search
 None
 See application file for complete search history.

(56) References Cited

U.S. PATENT DOCUMENTS

| | | | |
|---|---|---|---|
| 7,174,301 B2 * | 2/2007 | Florance et al. | 705/313 |
| 7,343,348 B2 * | 3/2008 | McAvoy et al. | 705/54 |
| 7,640,204 B2 * | 12/2009 | Florance et al. | 705/37 |
| 8,234,174 B1 * | 7/2012 | Eagon et al. | 705/22 |
| 2003/0078897 A1 * | 4/2003 | Florance et al. | 705/80 |
| 2004/0128215 A1 * | 7/2004 | Florance et al. | 705/28 |
| 2007/0168465 A1 * | 7/2007 | Toppenberg et al. | 709/218 |
| 2007/0244798 A1 * | 10/2007 | Weidenbenner | 705/37 |
| 2009/0094137 A1 * | 4/2009 | Toppenberg et al. | 705/27 |
| 2012/0066061 A1 * | 3/2012 | Clement | 705/14.49 |

* cited by examiner

*Primary Examiner* — Brian P Whipple
(74) *Attorney, Agent, or Firm* — Foley and Lardner LLP; John D. Lanza

(57) ABSTRACT

Systems and methods for real-time viewing and manipulation of information hosted on third-party systems are described. The system and methods enable property managers to create, edit and delete real estate vacancy postings on multiple sites from a single account, view metrics associated with the postings, and shift the administrative burdens associated with the unreliability of third-party systems to the system itself.

20 Claims, 13 Drawing Sheets

SYSTEMS AND METHODS FOR REAL-TIME VIEWING AND MANIPULATION OF INFORMATION HOSTED ON THIRD-PARTY SYSTEMS, INCLUDING METRICS, FALSE ACKNOWLEDGEMENTS, AND AUTO-COMPLETION FOR INPUTTING INFORMATION OVER A NETWORK

CROSS REFERENCE TO RELATED APPLICATIONS

The present application is a divisional of, and claims priority to, U.S. patent application Ser. No. 12/637,103 entitled "Systems and Methods for Real-Time Viewing and Manipulation of Information Hosted on Third-Party Systems, Including Metrics, False Acknowledgements, and Auto-Completion for Inputting Information Over a Network" and filed Dec. 14, 2009.

FIELD OF THE INVENTION

The present invention relates to computer network applications, and more specifically, a property management network application for real-time viewing and manipulation of information hosted on third-party systems, including metrics, false acknowledgements, and auto-completion for inputting information over a network.

BACKGROUND OF THE INVENTION

Property managers commonly submit postings for real estate properties on third-party systems to advertise vacancies. Preparing, submitting, and updating each posting can be a time consuming process. A property manager must visit a third-party system, identify the appropriate location on the system to post, provide information regarding the vacant property, and receive confirmation regarding the posting. Because the manager repeats similar steps for each third-party system, the amount of effort to advertise the vacancy scales with the number of third-party systems accessed. As the systems may have different requirements for their postings, a manager may need to select and submit information for a vacancy according to each system's requirements. Additionally, third-party systems can be unreliable and attempts to post vacancies to a system can fail. In these situations, a manager may repeat attempts to post to a system until the attempt succeeds, or attempt to post to a different system and return to the other system at a later time. As a result, the manager must track which third-party systems have successfully posted vacancies for a property and which systems the manager should re-visit. Furthermore, a manager often cannot objectively gauge the effectiveness of individual postings or third-party systems as a whole, relying instead on the systems' reputations for effectiveness and high-volume traffic.

BRIEF SUMMARY OF THE INVENTION

Enabling property managers to create and maintain real estate vacancy postings on multiple sites from a single account saves managers the administrative burden of visiting the individual sites. By delivering metrics on the vacancy postings to the account, the managers may easily compare the effectiveness of various postings, enabling managers to edit postings strategically or determine which locations for vacancy postings are most desirable. Tracking and re-attempting to access unavailable vacancy posting sites in a seamless manner to the managers shifts further administrative burdens away from managers.

In one aspect, the present invention relates to methods for aggregating information for real estate vacancy postings across third-party systems and submitting postings from a server. In one embodiment, the method includes: transmitting, by a first server, to a client a form with fields requesting information required for postings across third-party systems stored in a database; receiving, by the first server, the completed form from the client; creating, by the first server, a first real estate vacancy posting from a first subset of the completed fields according to requirements for a first third-party system; submitting, by the first server, the first real estate vacancy posting to a second server associated with the first third-party system; creating, by the first server, a second real estate vacancy posting from a second subset of the completed fields according to requirements for a second third-party system; submitting, by the first server, the second real estate vacancy posting to a third server associated with the second third-party system. In some embodiments, the method also includes submitting, by the first server, credentials to authenticate the user in order to submit the vacancy posting to the first third-party system In another aspect, the present invention relates to computer implemented systems for aggregating information for real estate vacancy postings across third-party systems and submitting postings from a first server. In one embodiment, the system includes: a transceiver on a first server in communication with a client, a second server, and a third server, the second and third servers each hosting a plurality of real estate vacancy postings; and a processor on the first server that transmits to a client a form with fields requesting information required for postings across third-party systems stored in a database; receives the completed form from the client; creates a first real estate vacancy posting from a first subset of the completed fields according to requirements for a first third-party system; submits the first real estate vacancy posting to the second server, the second server being associated with the first third-party system; creates a second real estate vacancy posting from a second subset of the completed fields according to requirements for a second third-party system, and submits the second real estate vacancy posting to the third server, the third server being associated with the second third-party system. In some embodiments, the processor submits credentials to authenticate the user in order to submit the vacancy posting to the first third-party system.

In another aspect, the present invention relates to methods for submitting a real estate vacancy posting to a third-party system from a server for a property management service. In one embodiment, the method includes: identifying, by a first server, a form for submitting a real estate vacancy posting to a second server based on information for a real estate property; requesting, by the first server, the identified form; altering, by the first server, the identified form to conform an appearance of the form to webpages of a property management service of the first server; receiving, by the first server, a completed form from a client; and submitting, by the first server, a real estate vacancy posting to the second server via the completed form.

In another aspect, the present invention relates to computer implemented systems for submitting a real estate vacancy posting to a third-party system from a server for a property management service. In one embodiment, the system includes a transceiver on a first server in communication with a client and a second server, the second server hosting a plurality of real estate vacancy postings; and a processor on the first server that identifies a form for submitting a real estate vacancy posting to a second server based on information for a real estate property, requests the identified form, alters the identified form to conform an appearance of the form to webpages of a property management service of the first server, receives a completed form from the client, and submits a real estate vacancy posting to the second server via the completed form.

In another aspect, the present invention relates to methods for aggregating and manipulating information comprising real estate vacancy postings from a plurality of websites. In one embodiment, the method includes: receiving, by a first server, an input from a user of a client requesting manipulation of information related to at least one real estate vacancy posting associated with the user; transmitting, by the first server, a request for manipulating information according to the input to a second server and a third server, the second and third servers each hosting a plurality of real estate vacancy postings; receiving, by the first server, responses from the second and third servers including manipulated information and updated metrics related to the at least one real estate vacancy posting associated with the user; and transmitting, by the first server, to the client a display including the manipulated information and the updated metrics related to the at least one real estate vacancy posting from the second and third servers.

In some embodiments, the input from the user requests a search through the at least one real estate vacancy posting associated with the user. In various embodiments, the method also includes transmitting, by the first server, to the client a display including a fake acknowledgement that the information has been manipulated. In many embodiments, the method also includes transmitting, by the first server, a request according to the input to the second server until the first server receives a response from the second server indicating that the information has been manipulated. In numerous embodiments, the method also includes buffering, by the first server, a request according to the input for transmitting to the second server. In some embodiments, the request for manipulating information is a request to create, edit, or delete a real estate vacancy posting. In many embodiments, the updated metrics are click-through rates for the at least one real estate vacancy posting. In further embodiments, the updated metrics include an updated click-through rate for a real estate vacancy posting hosted by the second server and an updated click-through rate for a real estate vacancy posting hosted by the third server.

In another aspect, the present invention relates to computer implemented systems for aggregating and manipulating information comprising real estate vacancy postings from a plurality of websites. In one embodiment, the system includes: a transceiver on a first server in communication with a client, a second server, and a third server, the second and third servers each hosting a plurality of real estate vacancy postings; and a processor on the first server that creates a request to send to the second and third servers according to an input from a user of the client requesting manipulation of information related to at least one real estate vacancy posting associated with the user; and creates a display for the client including the manipulated information and updated metrics related to the at least one real estate vacancy posting associated with the user received from the second and third servers.

In many embodiments, the input from the user requests a search through the at least one real estate vacancy posting associated with the user. In some embodiments, the display includes a false acknowledgement that the information has been manipulated. In various embodiments, the transceiver transmits the request to the second server until the system receives a response from the second server indicating that the information has been manipulated. In further embodiments, the system also includes a buffer that buffers the request according to the input for transmitting to the second server. In additional embodiments, the request for manipulating information is a request to create, edit, or delete a real estate vacancy posting. In numerous embodiments, the updated metrics are click-through rates for the at least one real estate vacancy posting. In some embodiments, the updated metrics include an updated click-through rate for a real estate vacancy posting hosted by the second server and an updated click-through rate for a real estate vacancy posting hosted by the third server.

BRIEF DESCRIPTION OF THE DRAWINGS

The foregoing and other objects, aspects, features, and advantages of the invention will become more apparent and better understood by referring to the following description taken in conjunction with the accompanying drawings, in which.

DETAILED DESCRIPTION OF THE INVENTION

Figure 1A:
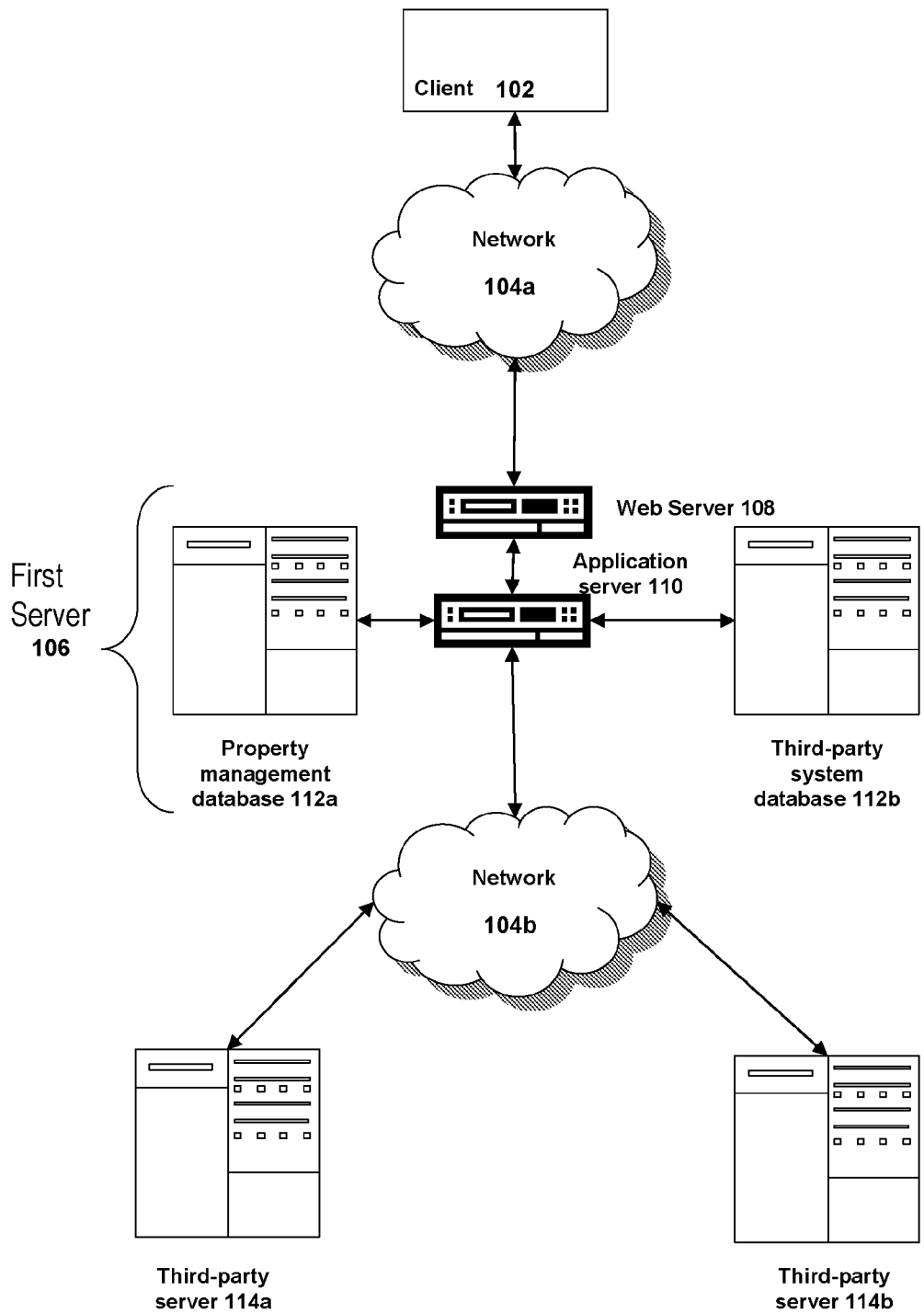
FIG. 1A is a block diagram of an embodiment of a system for real-time viewing and manipulation of information hosted on third-party systems.

Referring now to FIG. 1A, a block diagram of one embodiment of a system for real-time viewing and manipulation of information hosted on third-party systems is shown and described. In brief overview, a client 102 is connected via a network 104a to a first server 106. The first server 106 may comprise a number of elements including a web server 108, an application server 110, and a number of databases including property management database 112a and third-party system database 112b (generally 112). The first server 106 may store property management accounts for various organizations or individuals (also referred to herein as account users). The accounts may include information regarding properties under the account users' management, such as real estate vacancy postings. The first server 106 is connected via a network 104b to servers for third-party systems 114a and 114b (generally 114), also referred to herein as third-party servers. The third-party servers 114 may each host real estate vacancy postings.

Still referring to FIG. 1A, now in greater detail, a client 102 is shown. A client may comprise any computing device capable of sending or receiving information. Examples of clients 102 may include personal computers, laptop computers, desktop computers, personal digital assistants, and mobile phones. A client 102 may include a display device, such as a monitor or screen, for displaying information for a property management account to a user, and an input device, such as a keyboard or mouse, for accepting input of data to manipulation information for the account.

As shown, the client 102 is connected to the first server 106 via a network 104. The network 104 may comprise the Internet, local networks, web servers, file servers, routers, load balancers, databases, computers, servers, network appliances, or any other computing devices capable of sending and receiving information. The network 104 may comprise computing devices connected via cables, IR ports, wireless signals, or any other means of connecting multiple computing devices. The network and any devices connected to the networks may communicate via any communication protocol used to communicate among or within computing devices, including without limitation SSL, HTML, XML, RDP, ICA, FTP, HTTP, TCP, IP, UDP, IPX, SPX, NetBIOS, NetBEUI, SMB, SMTP, POP, IMAP, Ethernet, ARCNET, Fiber Distributed Data Interface (FDDI), RS232, IEEE 802.11, IEEE 802.11a, IEE 802.11b, IEEE 802.11g and direct asynchronous connections, or any combination thereof. The network 104 may comprise mobile telephone networks utilizing any protocol or protocols used to communicate among mobile devices, including AMPS, TDMA, CDMA, GSM, GPRS or UMTS. The network may comprise a plurality of physically distinct networks, and the network may comprise a plurality of sub-networks connected in any manner.

A first server 106 may comprise any server or servers capable of sending and receiving data. A first server 106 may perform any function related to the delivery and processing of information for property management accounts, including without limitation serving web pages displaying information for the accounts; receiving and processing web page input; storing user, property, and account information; and contacting and transacting with third-party servers 114. In one embodiment, a first server 106 may be implemented using an application server model, wherein a web server 110 handles web requests from clients and serves pages, an application server 115 coordinates logic for managing the property management account and associated real estate vacancy postings, and a number of databases 112 manage data, including without limitation account data and third-party system data. In another embodiment, a first server 106 may be implemented using a distributed, scalable, fault-tolerant, redundant server architecture.

A first server 106 may include one or more databases for storing the information in the property management accounts. A database may manage property management accounts, including without limitation addresses of properties, property descriptions, market rents, photographs of the properties, contact information for rental inquiries, third-party systems hosting vacancy postings for the property, and credentials associated with accounts on the third-party systems held by the property management account user. A database may comprise any storage of information on any hardware and in any format. Databases may include, without limitation, flat file structures, SQL databases, object-oriented databases, and relational databases.

Figure 1B:
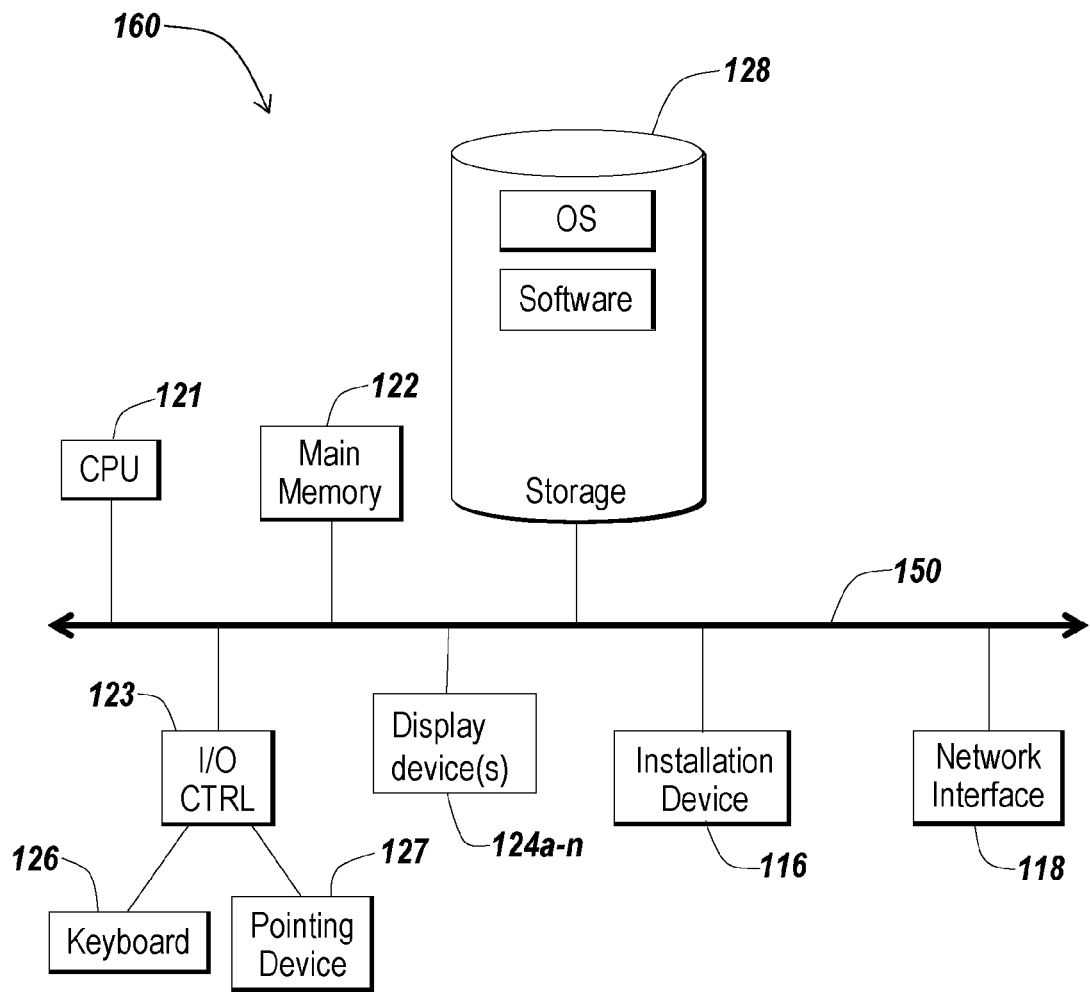
FIGS. 1B and 1C are block diagrams of example computing devices.
Figure 1C:
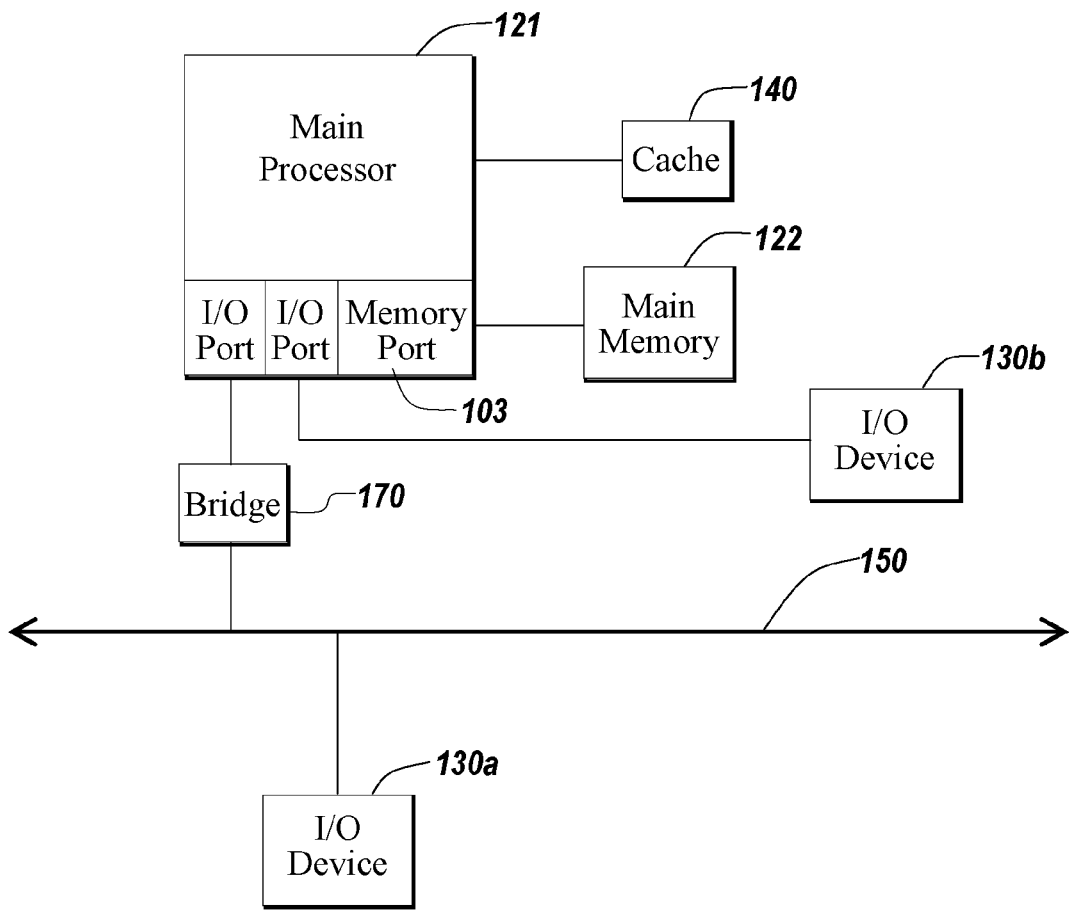

A client 102 and server 106 may be deployed as and/or executed on any type and form of computing device, such as a computer, network device or appliance capable of communicating on any type and form of network and performing the operations described herein. FIGS. 1B and 1C depict block diagrams of a computing device 160 useful for practicing an embodiment of the client 102 or a server 106. As shown in FIGS. 1B and 1C, each computing device 160 includes a central processing unit 121, and a main memory unit 122. As shown in FIG. 1B, a computing device 160 may include a visual display device 124, a keyboard 126 and/or a pointing device 127, such as a mouse. As shown in FIG. 1C, each computing device 160 may also include additional optional elements, such as one or more input/output devices 130a-130b (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 160 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 160 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer in which the main processor 121 communicates directly with I/O device 130b via HyperTransport, Rapid I/O, or InfiniBand. FIG. 1C also depicts an embodiment in which local busses and direct communication are mixed: the processor 121 communicates with I/O device 130a using a local interconnect bus while communicating with I/O device 130b directly.

The computing device 160 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs or portions thereof. The computing device 160 may further comprise a storage device, such as one or more hard disk drives or redundant arrays of independent disks, Flash memory, or EEPROMs, for storing an operating system and other related software, and for storing application software programs. Optionally, any of the installation devices 116 could also be used as the storage device. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 160 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET, ADSL, SDSL), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 160 communicates with other computing devices 160' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 160 to any type of network capable of communication and performing the operations described herein.

A wide variety of I/O devices 130a-130b may be present in the computing device 160. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 160. In still other embodiments, the computing device 160 may provide USB connections to receive handheld USB storage devices such as the USB Flash Drive line of devices manufactured by Twintech Industry, Inc. of Los Alamitos, Calif.

In some embodiments, the computing device 160 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 160. For example, the computing device 160 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 160 may include multiple video adapters, with each video adapter connected to one or more of the display devices 124a-124n. In some embodiments, any portion of the operating system of the computing device 160 may be configured for using multiple displays 124a-124n. In other embodiments, one or more of the display devices 124a-124n may be provided by one or more other computing devices, such as computing devices 100a and 100b connected to the computing device 160, for example, via a network. These embodiments may include any type of software designed and constructed to use another computer's display device as a second display device 124a for the computing device 160. One ordinarily skilled in the art will recognize and appreciate the various ways and embodiments that a computing device 160 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

A computing device 160 of the sort depicted in FIGS. 1B and 1C typically operates under the control of operating systems, which control scheduling of tasks and access to system resources. The computing device 160 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, and WINDOWS VISTA, all of which are manufactured by Microsoft Corporation of Redmond, Wash.; MACOS, manufactured by Apple Computer of Cupertino, Calif.; OS/2, manufactured by International Business Machines of Armonk, N.Y.; and Linux, an open source operating system distributed by, among others, Red Hat, Inc., or any type and/or form of a Unix operating system, among others.

The computer system 160 can be any workstation, desktop computer, laptop or notebook computer, server, handheld computer, mobile telephone or other portable telecommunication device, media playing device, mobile computing device, or any other type and/or form of computing, telecommunications or media device that is capable of communication and that has sufficient processor power and memory capacity to perform the operations described herein. For example, the computer system 160 may comprise a device of the IPHONE family of devices manufactured by Apple Computer of Cupertino, Calif.

Figure 1D:
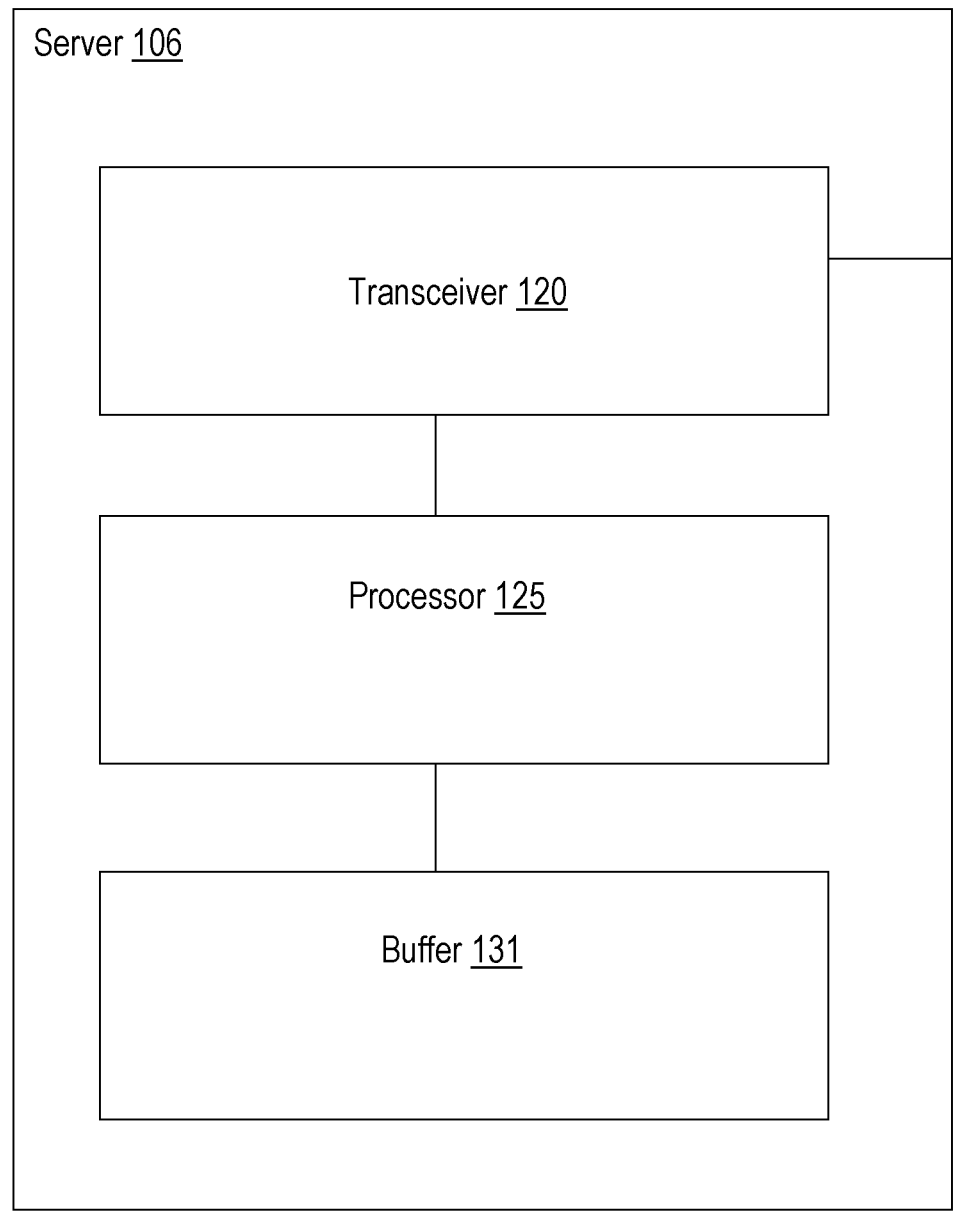
FIG. 1D is a block diagram of an embodiment of a first server used in the system of FIG. 1A.

Referring now to FIG. 1D, a block diagram of an embodiment of a first server 106 used in the system of FIG. 1A is shown and described. In brief overview, the first server 106 includes a transceiver 120, a processor 125, and a buffer 131. The transceiver 120, processor 125, and buffer 131 may occupy any of the elements of the first server 100. In one example, the transceiver 120 may occupy the web server 108. In another example, the processor 125 may occupy the application server 110. In yet another example, the buffer 131 may occupy the application server 110 or the property management database 112a.

The first server 106 uses the transceiver 120 to communicate with the client 102 or the third-party servers 114. The transceiver 120 may receive instructions to manipulate information for the property management account from a client 102. The processor 125 may process the instructions to add a new real estate property to the account, create a real estate vacancy posting for a property, edit the posting, or delete the posting. The processor 125 may create a request to create, edit, or delete a real estate vacancy posting for a third-party system. The transceiver 120 may transmit the request to the server associated with the third-party system. The processor 125 may store the request in the buffer 131 for the transceiver 120 to continue to transmit the processor 125 receives a response to the request. The processor 125 may create a fake acknowledgement indicating that the instruction has been successfully executed for the transceiver 120 to transmit to the client 102.

In some embodiments, some or all of the data server elements may occupy the same physical machine, and may share any resources, including processors, memory, and communication links. In other embodiments, a data server element may be distributed across multiple scalable, fault-tolerant, redundant machines. In some embodiments, these machines may be geographically distributed across a number of sites.

A property management account may comprise any information on organization or individual and properties associated with the organization or individual (e.g., properties under the organization's or user's management). In some embodiments, information on the organization or individual may include the name of the organization or individual, title of an individual, length of employment, and employee identification number. In various embodiments, information on the properties may include the address, neighborhood, property description, lease period, occupancy, and rental income. Information on the properties may also include the financial accounts holding the security deposits in escrow, images of the properties, floorplans, broker fees, utilities, amenities, and school district of each property. Information may also comprise the real estate vacancy postings for the properties hosted on third-party systems, such as craigslist.org or yahoo.com.

Figure 2:
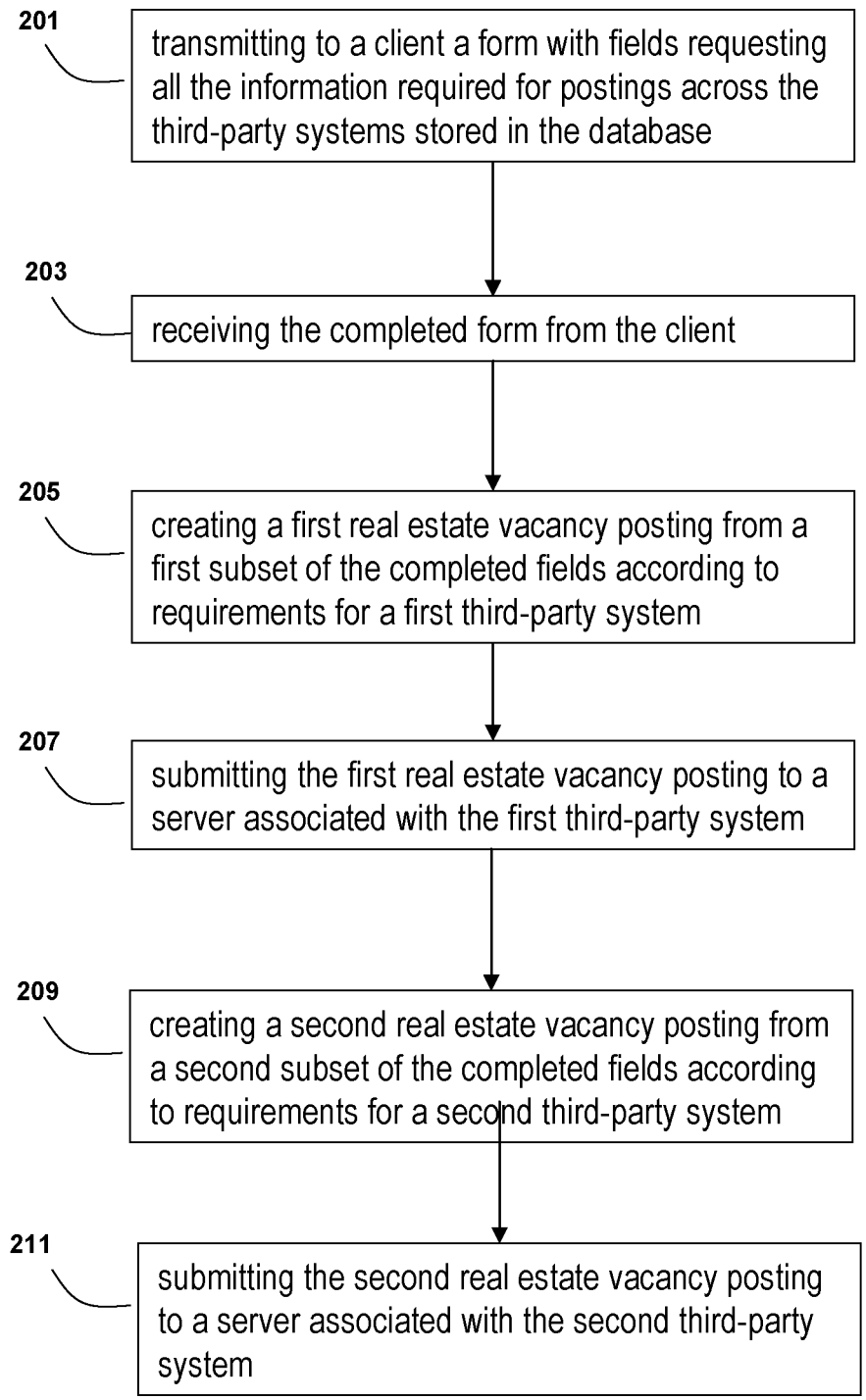
FIG. 2 is a flow diagram of a method for gathering information for real estate properties and submitting real estate vacancy postings to third-party systems.

Referring now to FIG. 2, a flow diagram of a method for gathering information for a real estate property and submitting real estate vacancy postings to third-party systems is shown and described. In brief overview, the method comprises: transmitting to a client a form with fields requesting all the information required for postings across the third-party systems stored in the database (step 201); receiving the completed form from the client (step 203); creating a first real estate vacancy posting from a first subset of the completed fields according to requirements for a first third-party system (step 205); submitting the first real estate vacancy posting to the first third-party system (step 207); creating a second real estate vacancy posting from a second subset of the completed fields according to requirements for a second third-party system (step 209); and submitting the second real estate vacancy posting to the second third-party system (step 211).

Still referring to FIG. 2, now in greater detail, a method for gathering information for a real estate property and submitting real estate vacancy postings to third-party systems comprises transmitting to a client a form with fields requesting all the information required for postings across the third-party systems stored in the database (step 201). In various embodiments, the first server 106 uses the third-party systems identified in the third-party system database 112b to create the form. In some embodiments, the first server 106 uses a default group of third-party systems to create the form. In other embodiments, the first server 106 uses a group of third-party systems selected by the account user to create the form. The first server 106 may communicate with the third-party servers 114 to create the form. The first server 106 may communicate with a first third-party system to determine the requirements for creating a vacancy posting on the system. The requirements may be stored in the third-party system database 112b. The first server 106 may create fields in the form to request information according to the requirements. For example, upon determining that a third-party system 114a requires an address, neighborhood, rental price, and lot size for a real estate vacancy posting, the first server 106 may create fields requesting such information in the form.

The first server 106 may communicate with a second third-party server 114b to determine the requirements for creating a vacancy posting on that system. The requirements may be stored in the third-party system database 112b. The first server 106 may create fields in the form to request information according to the requirements. For example, upon determining that a second third-party system 114b requires an address, neighborhood, rental price, and lot size for a real estate vacancy posting, the first server 106 may create fields requesting such information in the form. The first server 106 may continue communicating with additional third-party servers 114 until the server 106 has accounted for all systems to be used. In some embodiments, the first server 106 may determine if information required by one third-party system 114b is duplicative of information required by a previous third-party system 114a. In these embodiments, the first server 106 may refrain from creating new fields for required information if such fields already exist in the form.

In some embodiments, the first server 106 may organize the fields according to pre-determined categories designated by the property management account service. For example, the first server 106 may determine that a first field indicates the type of property (e.g., townhouse, condo, loft) and a second field relates to the floorplan (e.g., number of rooms, bedrooms, and bathroom). As a result, the first server 106 may determine that the first field may be organized under the category "Exterior features" while the second field may be organized under the category "Interior features." The first server 106 may place the fields in the corresponding categories on the form.

In many embodiments, the first server 106 stores the form. The first server 106 may store the form in the property management database 112a. In some embodiments, the form may be stored in association with a particular property management account. The first server 106 may transmit the form to a client 102 when an account user adds a new property to the account or creates real estate vacancy postings for an existing property. In more embodiments, the form may be stored as a default form in the property management database 112a. The form may be transmitted to an account user if the user has not expressed any preferences for third-party systems. In various embodiments, the first server 106 may update the form when the first server 106 adds or deletes a third-party system from the third-party system database 112b. In numerous embodiments, the form may be updated when an account user updates a list of preferred third-party systems to use.

After transmitting to a client a form with fields requesting all the information required for postings across the third-party systems stored in the database, the first server 106 may receive the completed form from the client (step 203). In some embodiments, the first server 106 may determine whether all the fields have been completed. If the first server 106 detects that at least one field is incomplete, the first server 106 may transmit an error message to the client 102. The error message may request the missing information in the form. The first server 106 may extract information from the fields of the completed form and store the information in the user's property management account.

After receiving the completed form from the client, the first server 106 may create a first real estate vacancy posting from a first subset of the completed fields according to requirements for a first third-party system (step 205) and submit the first real estate vacancy posting to the first third-party system (step 207). In various embodiments, the first server 106 may retrieve the requirements from the third-party system database 112b to identify requirements particular to the system. The first server 106 may use the requirements to determine a first subset of the completed fields to use in creating a vacancy posting for the first third-party system. In one example, the first server 106 may determine that the first third-party system requires the city, neighborhood, type of property, rental price, description of the property, and contact information of the user for the vacancy posting, although the form may have requested information such as the school district, utilities, and amenities.

In many embodiments, the first server 106 may use the first subset to populate a form for creating a vacancy posting. The first server 106 may submit the populated form to the first third-party system. In some embodiments, some of the fields in the first subset may be used to determine where the vacancy posting shall be listed. In one example, the first server 106 may use the city, neighborhood, and type of rental property to determine a location for the vacancy posting. The first server 106 may determine that a vacancy posting for the property should be listed under the categories "Boston→Back Bay→Apartments for Rent" on the third-party system. In other embodiments, the fields may not affect where the posting is located. In these embodiments, the first server 106 may submit a vacancy posting to the first third-party system, and users of the third-party system may find the vacancy posting by, for example, searching for text in a selected field of the postings.

In some embodiments, first server 106 may submit credentials to authenticate the user in order to submit the vacancy posting to the first third-party system. The first server 106 may submit the credentials to a server associated with the first third-party system. In various embodiments, the first server 106 may submit credentials to any third-party system or associated server to authenticate the user.

In some embodiments, the first server 106 may use credentials stored in the user's property management account. The first server 106 may request information to use as credentials when the user creates an account with the property management service. For example, the first server 106 may request preferred usernames, passwords, and security questions and answers. The first server 106 may request information based on the authentication requirements of the third-party systems. If desired, the user may later change the credentials stored in the account.

In various embodiments, the first server 106 may apply one or more rules to information in the user's property management account to create credentials for the third-party systems. In some embodiments, the first server 106 may use the user's username and password for the property management service as the username and password for the third-party systems. In other embodiments, the first server 106 may scramble information in the account to create the credentials. In some embodiments, the first server 106 may create such credentials when the user-submitted credentials are weak. In some examples, the first server 106 may scramble an individual's name and employee identification number to create a password. In other examples, the first server 106 may scramble the organization's and individual's name to create a username for a third-party system.

In some embodiments, the first server 106 may create an account with a third-party system when the first server 106 first receives information to use as credentials from the user or creates credentials according to information in the account. In other embodiments, the first server 106 may create the account when the first server 106 first submits a vacancy posting to the third-party system.

After creating and submitting the first real estate vacancy posting to the first third-party system, the first server 106 may create a second real estate vacancy posting from a second subset of the completed fields according to requirements for a second third-party system (step 209) and submit the second real estate vacancy posting to the second third-party system (step 211). In various embodiments, the first server 106 may retrieve the requirements from the third-party system database 112b to identify requirements particular to the system. The first server 106 may use the requirements to determine a second subset of the completed fields to use in creating a vacancy posting for the second third-party system. In one example, the first server 106 may determine that the second third-party system requires the city, neighborhood, address, type of property, rental price, security deposit, number of bedrooms, number of bathrooms, overall description of the property, school district and contact information of the user for the vacancy posting. The first server 106 may use the second subset to populate a form for creating a vacancy posting to the second third-party system.

The first server 106 may submit the populated form to the second third-party system. As with the first third-party system, some of the fields in the second subset may be used to determine where the vacancy posting shall be listed, though the fields also may not affect where the posting is located. Also as with the first third-party system, the first server 106 may submit credentials to authenticate the user in order to submit the vacancy posting to the second third-party system.

Figure 3:
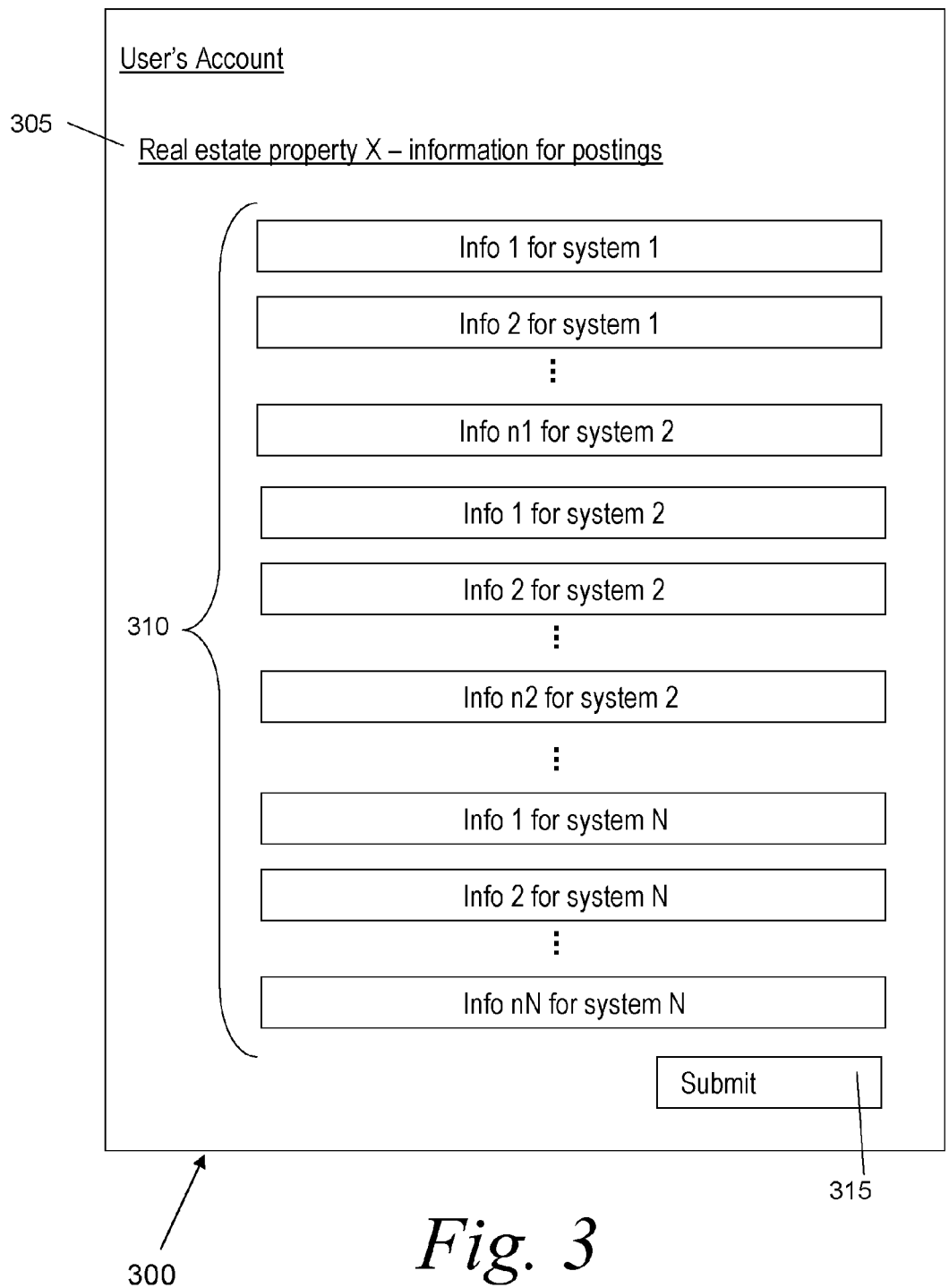
FIG. 3 is an example form with fields requesting information required for postings across third-party systems.

Referring now to FIG. 3, an example display of a form 300 with fields requesting all the information required for postings across the third-party systems is shown and described. The form 300 includes an identification of the property 305 for which the vacancy postings shall be created, fields 310 requesting information for postings, and a "Submit" button 315. A user may enter information into the fields 310 and select the Submit button 315 when the fields 310 are complete. In this embodiment, the fields 310 are grouped according to requirements for each third-party system. The fields request information for the first third-party system through the last third-party system, depicted as the "Nth" system. In other embodiments, the fields 310 may be aggregated to eliminate duplicate requests for information. In various embodiments, the fields 310 may be organized by category.

Figure 4:
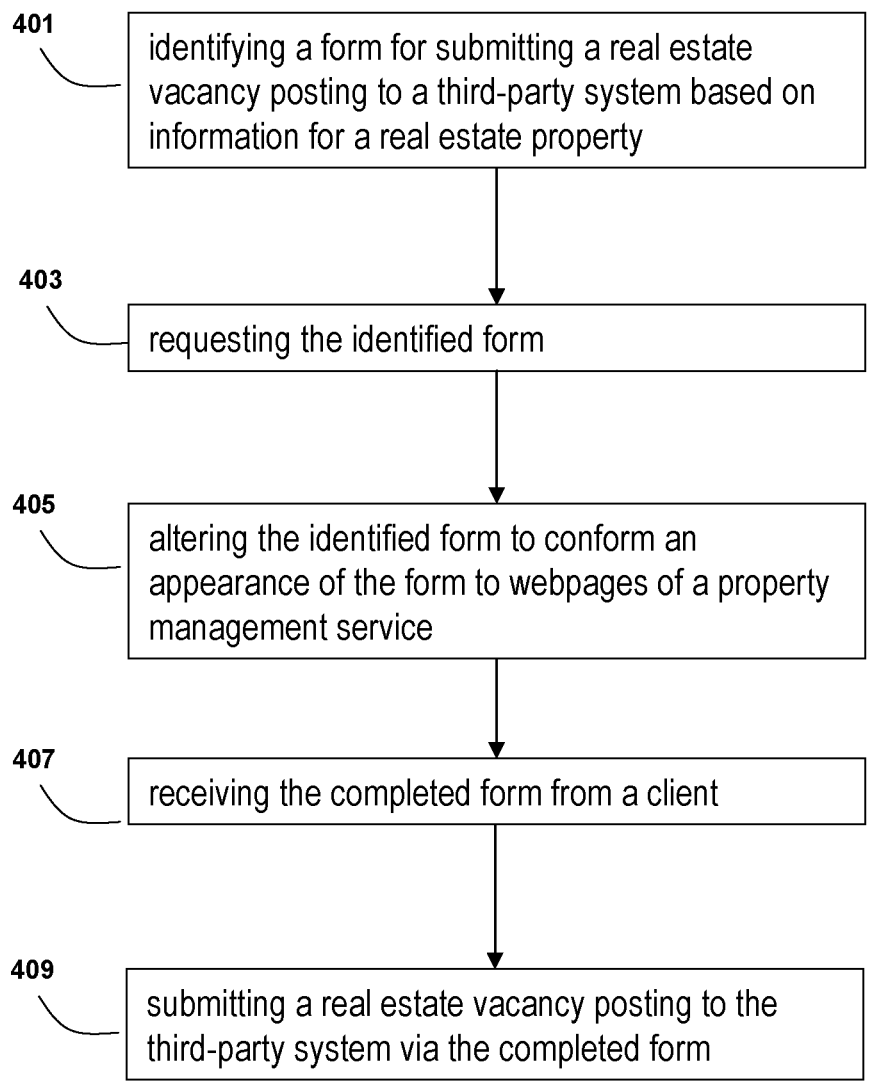
FIG. 4 is a flow diagram of a method for submitting a real estate vacancy posting to a third-party system from a server for a property management service.

Referring now to FIG. 4, a flow diagram of a method for submitting a real estate vacancy posting to a third-party system from a server for a property management service is shown and described. In brief overview, the method comprising: identifying a form for submitting a real estate vacancy posting to a second server based on information for a real estate property (step 401); requesting the identified form (step 403); altering the identified form to conform an appearance of the form to webpages of a property management service of the first server (step 405); receiving the completed form from a client (step 407); and submitting a real estate vacancy posting to the second server via the completed form (step 409). By retrieving forms for real estate vacancy postings from third-party systems and styling the forms according to the property management service, a user can list a property on third-party systems without visiting those systems directly. The property management service retrieves the needed forms to lessen the administrative burden on the user.

Still referring to FIG. 4, now in greater detail, a method for submitting a real estate vacancy posting to a third-party system from a server for a property management service comprises identifying a form for submitting a real estate vacancy posting to a third-party system based on information for a real estate property (step 401). In various embodiments, the first server 106 may identify a form on a server associated with the third-party system. The first server 106 may use any information or combination of information for the real estate property to identify the form. In some examples, the first server 106 may use the location of the property, the type of offering, or any other information or combination thereof to identify the form. If the property is located in San Francisco or New York, the server 106 may identify the form for listings in San Francisco or New York, respectively. If the property is for rent, sale, or sublet, the server 106 may identify the form for listings for properties for sale, properties for rent, or properties for sublet, respectively. If the property is an apartment for rent in San Francisco, the server 106 may identify the form for rental properties in San Francisco. If the property is an apartment for sublet in New York, the server 106 may identify the form for properties for sublet in New York. The server 106 may identify any form based on any combination of information for the property, as one of ordinary skill in the art would appreciate.

After identifying a form for submitting a real estate vacancy posting to a third-party system based on information for a real estate property, the first server 106 may request the identified form (step 403). The first server 106 may request the identified form from the server associated with the third-party system. In some embodiments, the first server 106 may navigate through webpages on the third-party server to request the identified form. For example, for a rental property in Boston, the first server 106 may navigate through webpages from the homepage of a third-party system to identify the form for rental properties in Boston. The first server 106 may first navigate from the homepage to the webpage for all Boston properties and then navigate to the webpage for Boston rental properties. The first server 106 may request from the webpage for Boston rental properties the form for listing properties on the webpage.

In various embodiments, the first server 106 may request the identified form by accessing an associated URL. The first server 106 may obtain the URL from the webpage where the server 106 will posting a listing. Accessing the URL of the identified form may return a webpage. The webpage may include code in a markup language, such as HTML or XHTML.

After requesting the identified form, the first server 106 may alter the identified form to conform an appearance of the form to webpages of the property management service of the first server (step 405). In various embodiments, the first server 106 may alter the form by removing and/or inserting code into the webpage before displaying the webpage to the client. The first server 106 may remove code associated with graphical design or layout from the requested form. For example, the first server 106 may remove code that specifies font types, font sizes, offsets for displayed fields on the webpage, logos and backgrounds associated with the third-party system, or any other parameter set by the third-party system.

The first server 106 may add code to the webpage that conforms the webpage's appearance to the property management service. For example, the first server 106 may add code that displays text in the font type and size used by the property management service. The first server 106 may add code that organizes the form's fields according to a layout used for other webpages of the property management service. The first server 106 may add code that styles the webpage according to the property management service's branding. For example, such code may depict the service's logo, trademark colors, and icons.

After altering the identified form to conform an appearance of the form to webpages of a property management service of the first server, the first server 106 may receive the completed form from the client (step 407). In some embodiments, the first server 106 may determine whether all the fields have been completed. If the first server 106 detects that at least one field is incomplete, the first server 106 may transmit an error message to the client 102. The error message may request the missing information in the form.

After receiving the completed form from the client, the first server 106 may submit a real estate vacancy posting to the third-party system via the completed form (step 409). The first server 106 may submit the completed form presented to the client to the server of the third-party system to create a real estate vacancy posting. In many embodiments, the first server 106 may remove code added to alter the appearance of the form and/or re-introduce code from the third-party system that was previously removed, i.e. any code added or removed in step 405.

Figure 5:
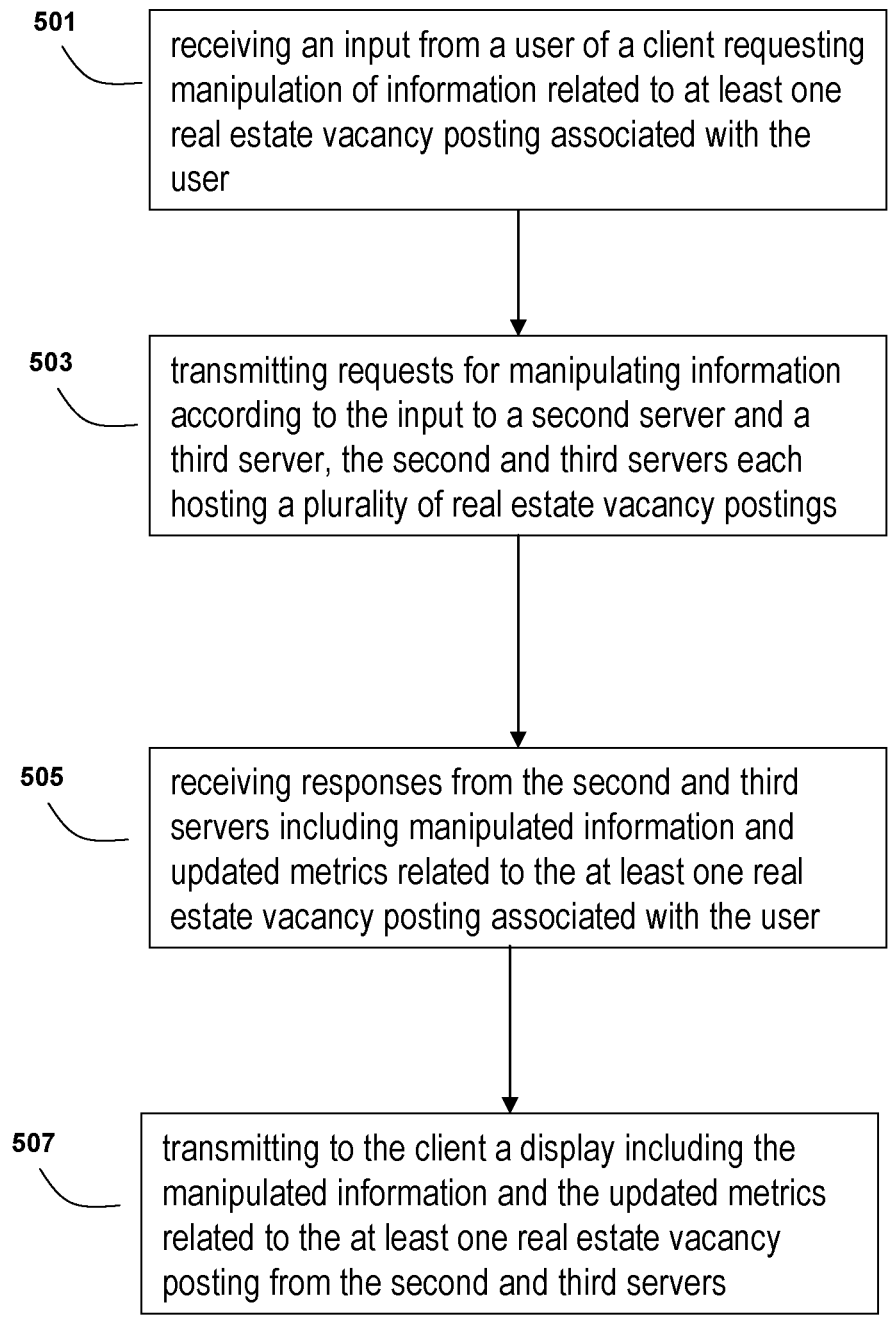
FIG. 5 is a flow diagram of a method for real-time viewing and manipulation of information, including metrics, hosted on third-party systems.

Referring now to FIG. 5, a flow diagram of a method for real-time viewing and manipulation of information, including metrics, hosted on third-party systems is shown and described. In brief overview, the method comprises: receiving an input from a user of a client requesting manipulation of information related to at least one real estate vacancy posting associated with the user (step 501); transmitting requests for manipulating information according to the input to a second server and a third server, the second and third servers each hosting a plurality of real estate vacancy postings (step 503); receiving responses from the second and third servers including manipulated information and updated metrics related to the at least one real estate vacancy posting associated with the user (step 505); and transmitting to the client a display including the manipulated information and the updated metrics related to the at least one real estate vacancy posting from the second and third servers (step 507).

Still referring to FIG. 5, now in greater detail, a method for real-time viewing and manipulation of information hosted on third-party systems comprises receiving an input from a user of a client requesting manipulation of information related to at least one real estate vacancy posting associated with the user (step 501). In various embodiments, the first server 106 may receive the input according to any communication protocol, including specialized protocols, for communicating with a client 102. The input may be a request to edit a real estate vacancy posting, a plurality of real estate vacancy postings, or any real estate vacancy postings associated with a property that require the information that is being edited. In some embodiments, a user at a client 102 may submit the input by editing an individual real estate vacancy posting. In other embodiments, the user may submit the input by retrieving, for a property, the form with fields requesting all the information required for postings across the third-party system and editing one or more fields.

After receiving an input from a user of a client requesting manipulation of information related to at least one real estate vacancy posting associated with the user, the first server 106 may transmit requests for manipulating information according to the input to a second server and a third server, the second and third servers each hosting a plurality of real estate vacancy postings (step 503). The first server 106 may interpret the input to create one or more requests to edit postings. When a user is editing an individual real estate vacancy posting, the first server 106 may identify the third-party system associated with the posting. The first server 106 may access a site on the third-party server 114 to edit the posting. In some embodiments, the first server 106 uses an identifier, such as a post number, to access the site. The first server 106 may populate fields on the site according to the user input to edit the posting.

In some embodiments, the user may edit vacancy postings associated with a property. In these embodiments, the user may retrieve, for the property, the form with fields requesting all the information required for postings across the third-party systems and edit one or more fields. The first server 106 may identify third-party systems hosting postings for the property that require the information being edited. The first server 106 may access the site on each identified third-party system to edit the hosted posting and populate fields on the site according to the user input.

After transmitting requests for manipulating information according to the input to a second server and a third server, the first server may receive responses from the second and third servers including manipulated information and updated metrics related to the at least one real estate vacancy posting associated with the user (step 505). The manipulated information may include a rendering of the edited vacancy posting. The updated metric may be any measure of traffic for the posting. In some embodiments, the metric may be a click-through rate. The third-party system may count and analyze clicks for the posting. In other embodiments, the metric may be a viewing rate. The third-party system may track and analyze time that customers have spent accessing or viewing the posting. In additional embodiments, the metric may be the absolute number of times the posting has been viewed.

In some embodiments, when a posting is edited, the associated metric may be reset to reflect only traffic associated with the edited posting. In other embodiments, the metric is not reset and changes in the metric with the continued measurement of traffic may reflect the effect of the edits. In some embodiments, the third-party server 114 may update the metric in response to requests to manipulate information for a posting from the first server 106. In various embodiments, the first server 106 may receive the updated metric live, i.e. the third-party server updates the metric in real-time. The third-party server may transmit an updated metric on a continuous basis. In other embodiments, the first server 106 may receive the updated metric at predetermined intervals. The third-party server may transmit an updated metric after predetermined lengths of time have elapsed. The third-party server may collect and aggregate information associated with the metric for the posting. At the predetermined intervals, the hosting server may process the aggregated information to update and transmit the metric to the first server 106.

After receiving responses from the second and third servers including manipulated information and updated metrics related to the at least one real estate vacancy posting associated with the user, the first server 106 may transmit to the client a display including the manipulated information and the updated metrics related to the at least one real estate vacancy posting from the second and third servers (step 507). The first server 106 may organize the information in metrics according to a display, such as in FIG. 8, described in more detail below.

Figure 6:
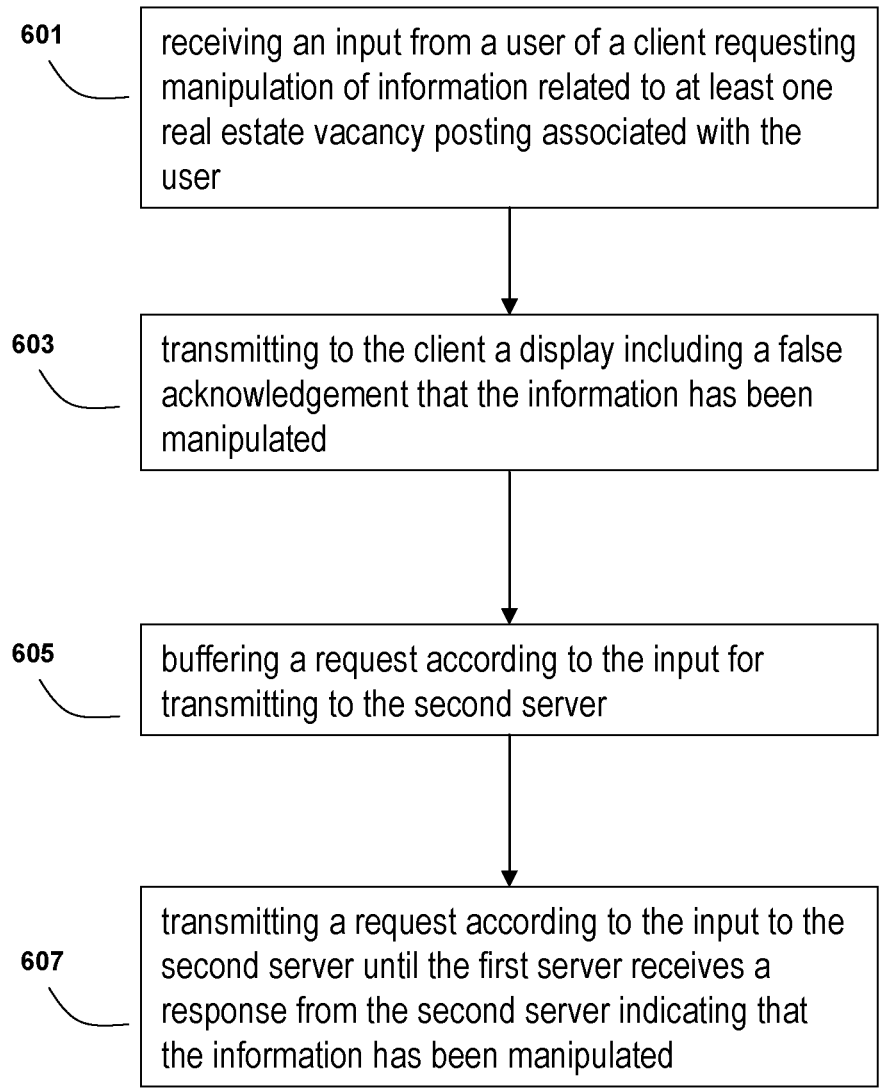
FIG. 6 is a flow diagram of a method for real-time viewing and manipulation of information, including false acknowledgements, hosted on third-party systems.

Referring now to FIG. 6, a flow diagram of a method for real-time viewing and manipulation of information, including false acknowledgements, hosted on third-party systems is shown and described. In brief overview, the method comprises: receiving an input from a user of a client requesting manipulation of information related to at least one real estate vacancy posting associated with the user (step 601); transmitting to the client a display including a false acknowledgement that the information has been manipulated (step 603); buffering a request according to the input for transmitting to the second server (step 605); and transmitting a request according to the input to the second server until the first server receives a response from the second server indicating that the information has been manipulated (step 607).

Still referring to FIG. 6, now in greater detail, a method for real-time viewing and manipulation of information, including false acknowledgements, hosted on third-party systems comprises receiving an input from a user of a client requesting manipulation of information related to at least one real estate vacancy posting associated with the user (step 601). The first server 106 may receive the input according to any of the methods described in reference to FIG. 5.

After receiving an input from a user of a client requesting manipulation of information related to at least one real estate vacancy posting associated with the user, the first server 106 may transmit to the client a display including a false acknowledgement that the information has been manipulated (step 603). The first server 106 may use the input to determine the false acknowledgement to display. For example, if the input attempts to edit fields in a posting, the first server 106 may select a display that says "Posting updated!," such as the display in FIG. 9B, described in more detail below. If the input attempts to create or delete a vacancy posting, the first server 106 may select a display that says "Posting created" or "Posting deleted," respectively.

After transmitting to the client a display including a false acknowledgement that the information has been manipulated, the first server 106 may buffer a request according to the input for transmitting to a third-party server (step 605). The first server 106 may interpret the input for manipulating information to create one or more requests to create, edit, or delete a posting. The request may include a third-party system and information for populating fields of a posting on the system. The request may include an identifier of a posting, such as a posting number, the third-party system hosting the posting, and the information to edit. The request may include an identifier of a posting, such as a posting number, the third-party system hosting the posting, and an instruction to delete the posting. The first server 106 may store the request in a buffer 131.

After buffering a request according to the input for transmitting to a third-party server, the first server may transmit the request to the third-party server until receiving a response indicating that the information has been manipulated (step 607). The first server 106 may transmit to a third-party server 114 the stored request to manipulate the posting. If the first server 106 does not receive a response within a predetermined period of time, the server may assume the third-party system is unavailable to service the request. The first server 106 may determine a subsequent time to resend the request to the third-party server 114. In some embodiments, the first server 106 may calculate the subsequent time by adding a predetermined length of time to the last attempt at sending and store the time with the request in the buffer 131. The processor 125 retrieves the request from the buffer 131 at the subsequent time and resends the request. If the first server 106 receives a response from the third-party system 114 indicating that the posting has been successfully manipulated, the request may be removed from the buffer.

Figure 7:
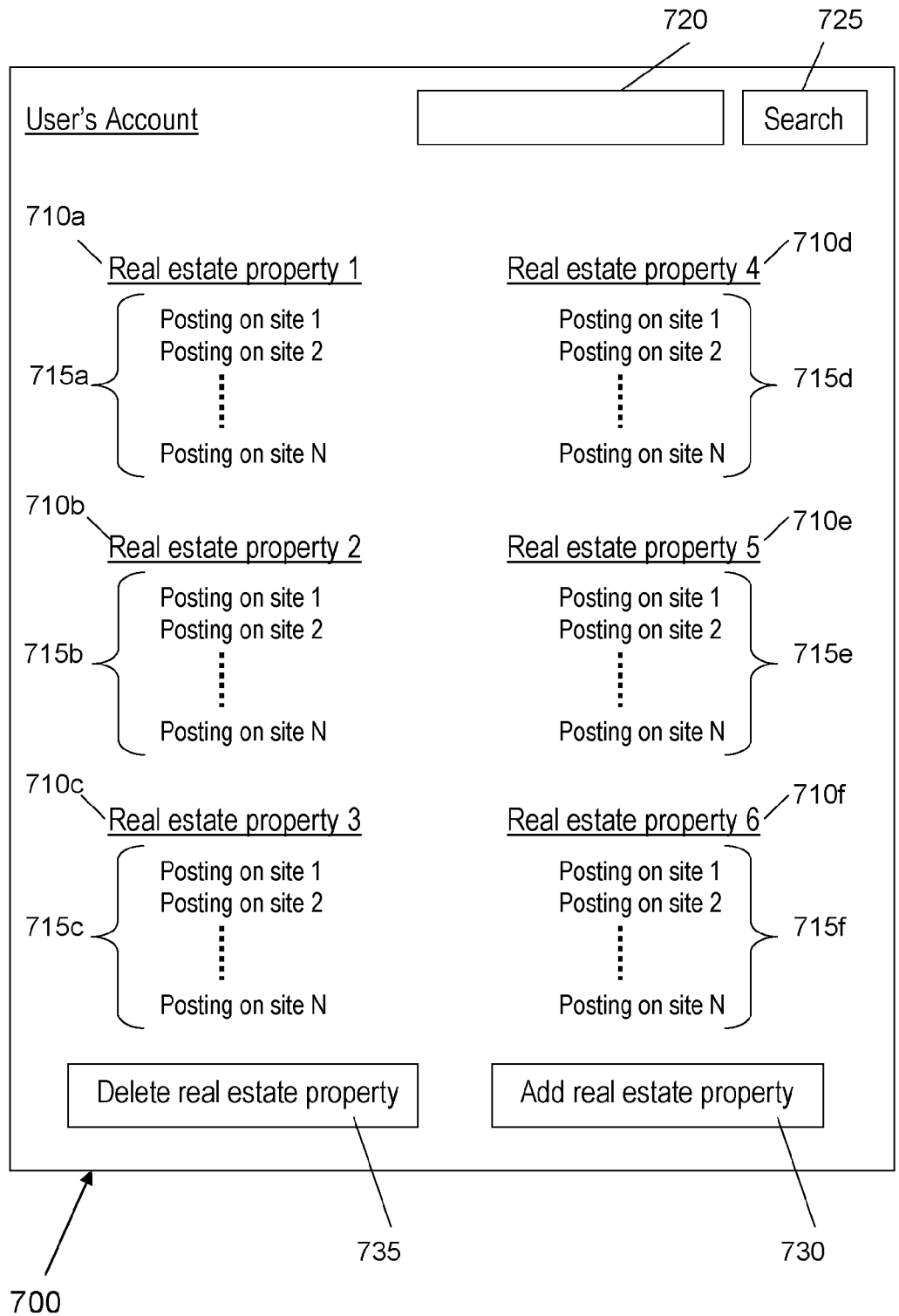
FIG. 7 is an example dashboard displaying properties in a property management account and vacancy postings associated with each property.

Referring now to FIG. 7, an example dashboard 700 displaying properties in a property management account and vacancy postings associated with each property is shown and described. In brief overview, the dashboard 700 includes a plurality of properties 710a, 710b ... 710f (generally 710) in a property management account, a plurality of real estate vacancy postings associated with each property 715a, 715b ... 715f (generally 715), a search field 720, a search button 725, an "Add Real Estate Property" button 730, and a "Delete Real Estate Property" button 735. Although this embodiment shows six real estate properties associated with the account, any number of properties may be used.

Still referring to FIG. 7, now in greater detail, the dashboard 700 may include a plurality of properties 710 in a property management account. In this embodiment, each property 710 may be identified via a descriptor. The descriptor may be, for example, the address of the property, an image of the property, or any other information or combination thereof. In various embodiments, the property management account service may select predetermined information about a property to use as the descriptor. In some embodiments, an account user may configure the information to be used for the descriptor. In various embodiments, in response to a user selecting a property 710, the first server 106 may redirect the user to a dashboard such as FIG. 8, as explained in more detail below.

In this embodiment, a user may add a property to the account by selecting the "Add Real Estate Property" button 730. The first server 106 may transmit to the user a form with fields requesting information about the property. In some embodiments, the form may request information for creating a record merely as a placeholder for a property. In other embodiments, the form request all the information required for postings across the third-party systems stored in the database, such as the form described in reference to FIG. 2. Completion and submission of the form creates a record in the user's account for the property.

The dashboard 700 may show a plurality of real estate vacancy postings 715 associated with each property 710. The real estate vacancy postings 715 may indicate the third-party systems where the postings are hosted. In some embodiments, the vacancy postings 715 may be hyperlinks to the postings. In other embodiments, selection of a vacancy posting 715 may re-direct the user to a web page displaying information about the posting, such as the web page of FIG. 9A, as explained in more detail below.

A user may delete a property from the account by selecting one of the properties 710 and selecting the "Delete Real Estate Property" button 735. In response, the first server 106 may delete the record for the selected property from the account. The first server 106 may automatically delete all vacancy postings 710 for a property when the property is removed. The first server 106 may request removal of the vacancy postings from the third-party systems hosting the postings.

In further embodiments, the user may search the properties 710 and their associated postings 715 by entering search parameters in the search field 720 and selecting the search button 725. In one example, the user may search for postings listed on craigslist.org with a click-through rate equal to or greater than 25%, and the first server 106 may display postings with the desired characteristics. In this manner, the user may compare postings with high click-through rates to identify traits that generate viewing traffic. In another example, the user may search for postings listed more than 90 days to identify postings the user may want to edit to increase the listing's effectiveness. In a further example, the user may search for postings in a neighborhood to compare rental prices for comparable properties, thereby assisting the user to set a rental price for a new property to list. In another example, the user may search for postings with images to determine which images are more effectiveness. In various embodiments, the user may limit the search space. For example, the user may search only through the postings for a particular property. In another example, the user may search only through postings created before or after a particular date.

Figure 8:
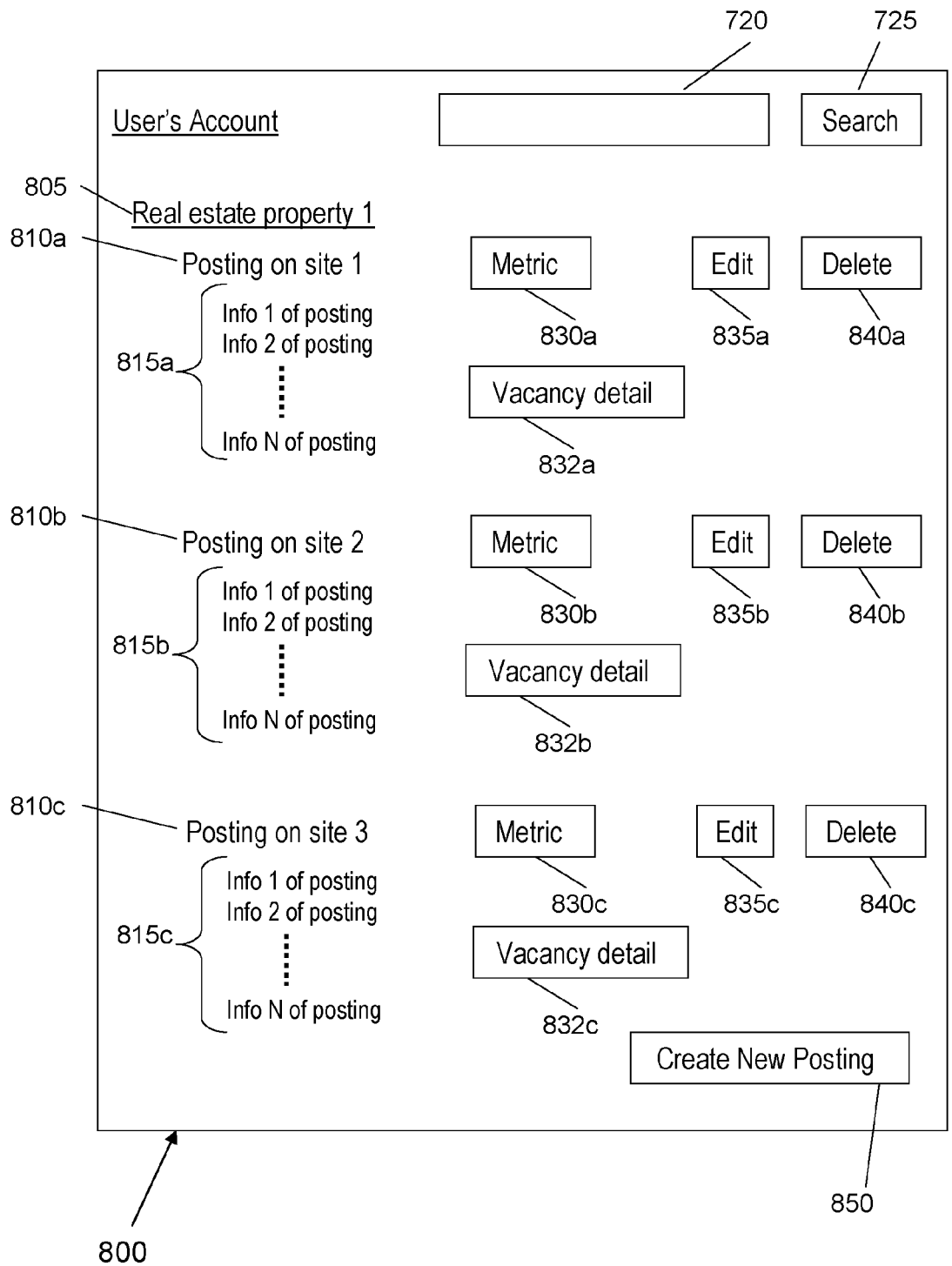
FIG. 8 is an example dashboard displaying a property with associated vacancy postings and metrics.

Referring now to FIG. 8, an example dashboard 800 displaying a property with associated vacancy postings and metrics is shown and described. In brief overview, the dashboard 800 includes a descriptor 805 for the property, a plurality of vacancy postings 810a, 810b, 810c (generally 810) for the property; information regarding each vacancy posting 815a, 815b, 815c (generally 815), metrics 830a, 830b, 830c (generally 830), vacancy details 832a, 832b, 832c (generally 832), edit buttons 835a, 835b, 835c (generally 835), and delete buttons 840a, 840b, 840c (generally 840) for each property. The dashboard 800 also includes a "Create New Posting" button 850 to transmit a real estate vacancy posting to another third-party system. Although this embodiment shows three vacancy postings associated with the property, any number of postings may be used.

The information regarding a vacancy posting 810 for the property 805 may include the information in the posting hosted on the third-party system. In various embodiments, the information 815 may indicate the information required to create the posting. The information 815 may identify the third-party system hosting the posting. In many embodiments, the information 815 may include the date of the original posting, the date the posting will expire, the fee for listing the posting, or any other information.

The metric 830 associated with a posting 810 may be any measure of traffic, as described in reference to FIG. 2. In various embodiments, the first server 106 may receive updates to the metric on a continuous basis or at predetermined intervals. In this manner, a user viewing the dashboard 800 may understand, in real-time or over time, the effectiveness of the postings with respect to traffic. For example, the user may observe which third-party systems generally receive the most traffic. In another example, certain images of the property may generate more traffic than others. In yet another example, postings for properties in urban areas that indicate proximity to public transportation may generate more traffic. An account user may have experimented with different property descriptions and have discovered that one description generates more traffic than another. The observations may prompt an account user to delete ineffective postings or edit postings to be more effective.

The vacancy detail 832 associated with a posting 810 may indicate the time lapse between the posting's creation and the filling of the vacancy. In many embodiments, the vacancy detail 832 may indicate that the vacancy is still open. For example, the vacancy detail may be "open," "available," "vacant," or any similar indication. In other embodiments, the vacancy detail 832 may indicate the number of days, months, or years that the vacancy remained open before being filled. In this manner, a user viewing the dashboard 800 may understand the overall effectiveness of the postings in filling vacancies. For example, the user may observe that postings on one third-party system consistently fill vacancies in shorter periods of time than postings on another third-party system. In another example, the user may observe that postings filled within a desired amount of time typically have metrics above a floor. If a posting's metric is below the floor, the user may edit the posting with a view towards improving the metric and consequently, the likelihood the posting will be filled.

The user may select the delete button 840 to delete a vacancy posting 810. Although a user may wish to delete a posting for ineffectiveness, the user may also delete the posting when the property is no longer vacant, the management company is no longer responsible for the property, or any other reason. The first server 106 may communicate with the third-party server to delete the vacancy posting. The first server 106 may also remove the vacancy posting 810a from the property account management system.

The user may select the edit button 840 to edit the vacancy posting. The first server 106 may direct the user to a screenshot such as FIG. 9A, described in more detail below, to edit the posting. After the user saves the edits, the first server 106 may update the information on the posting 815 to reflect the changes. The first server 106 may communicate with a third-party system to edit the hosted posting, as described in reference to FIG. 5. In various embodiments, by continuing to observe the metrics 830 from the dashboard 800, a user may detect how edits improve or lessen the effectiveness of a posting.

The user may create a new vacancy posting for the property by selecting the "Create New Posting" button 850. The first server 106 may present the user with a list of enumerated third-party systems from the third-party system database 112b, and the user may select one or more of the third-party systems. In some embodiments, the first server 106 may automatically populate and submit vacancy postings to the selected third-party systems based on the information about the property received upon the property record's creation. In other embodiments, the first server 106 may populate the fields for a vacancy posting for a first selected third-party system, but display the fields to the user for further edits. The first server 106 may display a web page similar to the display for editing a posting, such as FIG. 9A. When the user approves the fields by, for example, selecting a "Submit Posting" button, the first server 106 may submit a request to create the vacancy posting to the first selected third-party system. The first server 106 may then display a web page with populated fields for a second selected third-party system for the user to edit, and the first server 106 may continue until the server has submitted vacancy postings to all the selected third-party systems.

Figure 9A:
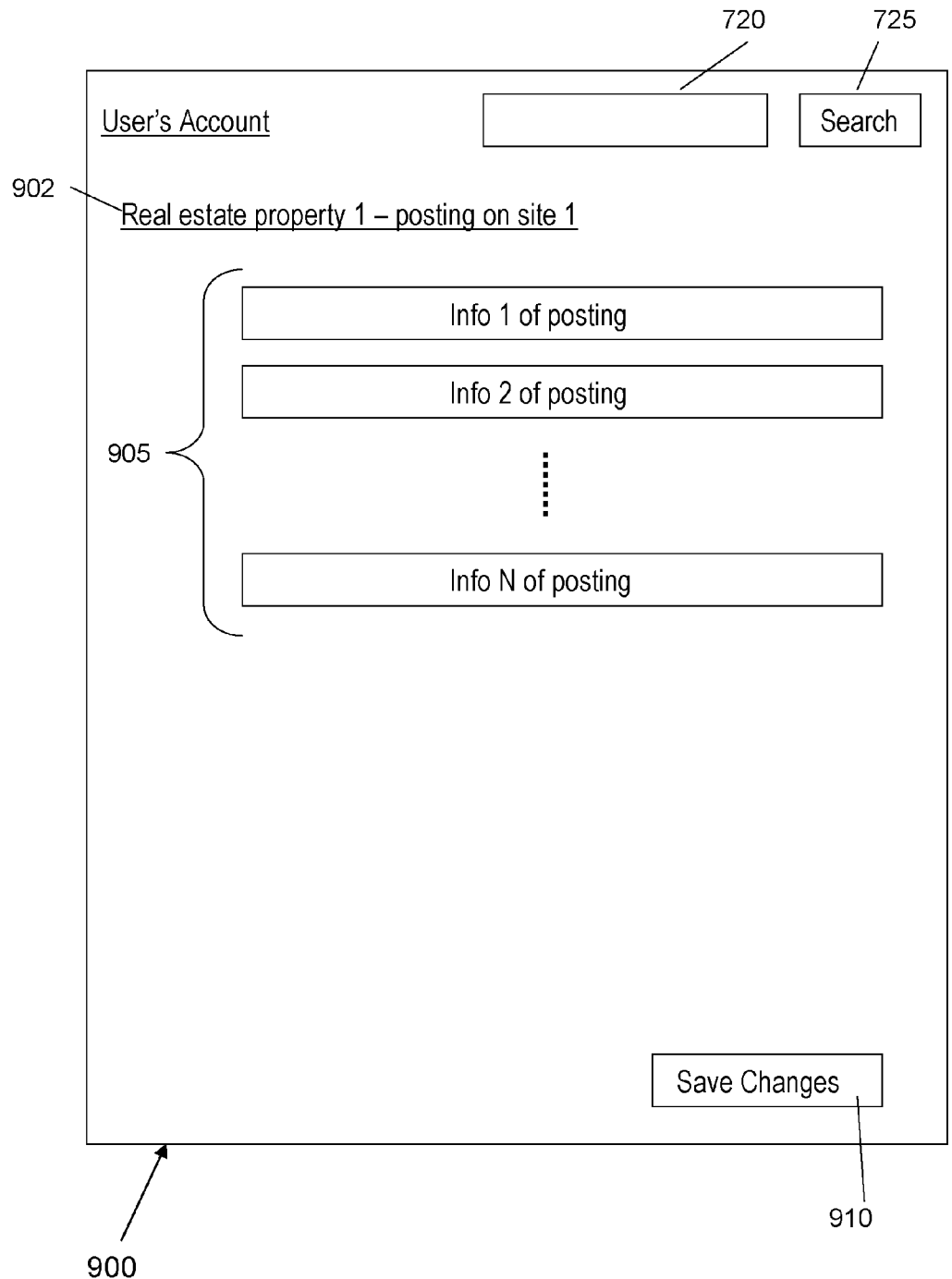
FIG. 9A is a screenshot of a web page displaying fields of a vacancy posting for editing.

Referring now to FIG. 9A, an example web page displaying fields of a vacancy posting for editing is shown and described. In brief overview, the web page 900 includes the descriptor 902 of the property, fields requesting information for a posting 905, and a "Save Changes" button 910. Although this web page 900 may be used for editing a pre-existing vacancy posting, similar web pages may be used for creating postings.

The fields 905 may request information required for a vacancy posting on a third-party system. The number and type of fields 905 may vary according to the requirements of the third-party system. For example, for a third-party system that requires five pieces of information and allows one image for upload, the first server 106 may generate a web page with five fields to receive the information and permit the user to upload only one image of the property. In another example, for a third-party system that requires nine pieces of information and allows unlimited image for upload, the first server 106 may generate a web page with nine fields to receive the information and permit the user to upload unlimited images.

In some embodiments, the first server 106 may automatically populate the fields 905 with pre-existing information for the posting. In other embodiments, the first server 106 may display a field as blank once a user begins editing the field. The first server 106 may auto-complete a field in response to a user input. In these embodiments, as the user types, the text field may send the input to the first server 106, which may analyze the partially typed input to provide a completed response. For example, the user may type "Bo" into a field. The client 102 may transmit the partially typed message to the first server 106, which then may search the user's properties and identify one or more entries for "Boston", and auto-complete the field. The user may then submit the auto-completed form by selecting the "Save Changes" button 910, and the information may be transmitted to the first server 106.

Figure 9B:
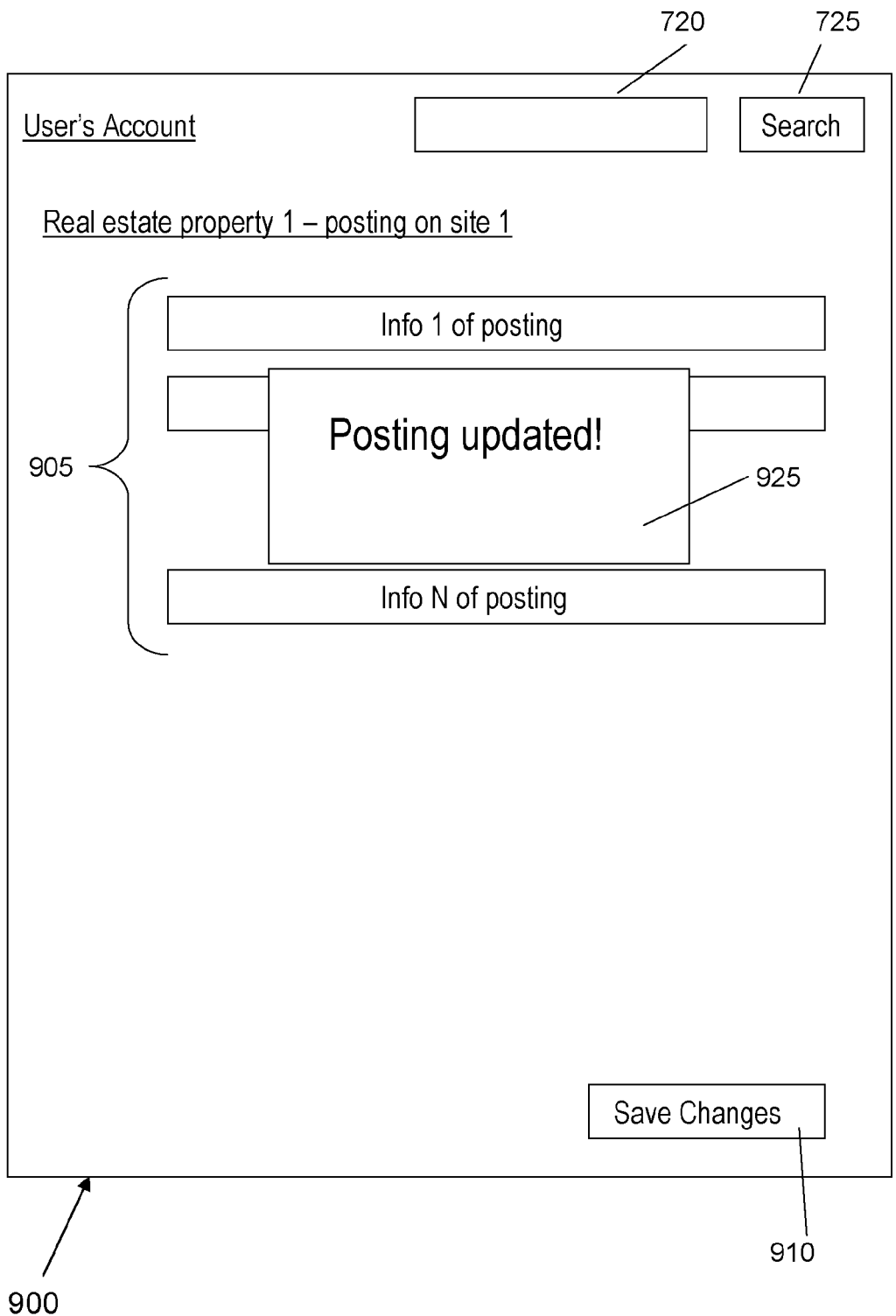
FIG. 9B is a screenshot of a web page displaying a fake acknowledgement of a submitted edited posting.

Referring now to FIG. 9B, a screenshot of a dashboard displaying a fake acknowledgement of a submitted edited posting is shown and described. In brief overview, the web page 900 includes the descriptor 902 of the property, fields requesting information for a posting 905, a "Save Changes" button 910, and a fake acknowledgement 925. In this embodiment, the fake acknowledgement indicates that a posting has been updated, though various embodiments for creating a new vacancy posting and displaying a fake acknowledge indicate the posting has been created may be similarly contemplated. The fake acknowledgement 925 may be used to hide the administrative burden of posting or editing postings on unreliable third-party systems from the user, as described in reference to FIG. 6.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method for aggregating information for real estate vacancy postings across third-party systems and submitting postings from a server, the method comprising:
    transmitting, by a first server, to a client a form with fields requesting information required for postings across third-party systems stored in a database;
    receiving, by the first server, a completed form from the client, the completed form comprising at least one completed field;

creating, by the first server, a first real estate vacancy posting from a first subset of the completed fields according to requirements for a first third-party system;

submitting, by the first server, the first real estate vacancy posting to a second server associated with the first third-party system;

creating, by the first server, a second real estate vacancy posting from a second subset of the completed fields according to requirements for a second third-party system;

submitting, by the first server, the second real estate vacancy posting to a third server associated with the second third-party system.

2. The method of claim 1, further comprising:

submitting, by the first server, credentials to authenticate a user of the client in order to submit the first real estate vacancy posting to the second server.

3. A method for submitting a real estate vacancy posting to a third-party system from a server for a property management service, the method comprising:

identifying, by a first server, a form for submitting a real estate vacancy posting to a second server based on information for a real estate property;

requesting, by the first server, the identified form;

altering, by the first server, the identified form to conform an appearance of the form to webpages of a property management service of the first server;

receiving, by the first server, a completed form from a client; and submitting, by the first server, a real estate vacancy posting to the second server via the completed form.

4. A computer implemented system for aggregating information for real estate vacancy postings across third-party systems and submitting postings from a first server, the system comprising:

a transceiver on a first server in communication with a client, a second server, and a third server, the second and third servers each hosting a plurality of real estate vacancy postings; and a processor on the first server that transmits to a client a form with fields requesting information required for postings across third-party systems stored in a database; receives a completed form from the client, the completed form comprising at least one completed field;

creates a first real estate vacancy posting from a first subset of the completed fields according to requirements for a first third-party system; submits the first real estate vacancy posting to the second server, the second server being associated with the first third-party system; creates a second real estate vacancy posting from a second subset of the completed fields according to requirements for a second third-party system, and submits the second real estate vacancy posting to the third server, the third server being associated with the second third-party system.

5. The system of claim 4, wherein the processor submits credentials to authenticate a user of the client with the second server in order to submit the first real estate vacancy posting.

6. A computer implemented system for submitting a real estate vacancy posting to a third-party system from a server for a property management service, the system comprising:

a transceiver on a first server in communication with a client and a second server, the second server hosting a plurality of real estate vacancy postings; and a processor on the first server that identifies a form for submitting a real estate vacancy posting to a second server based on information for a real estate property, requests the identified form, alters the identified form to conform an appearance of the form to webpages of a property management service of the first server, receives a completed form from the client, and submits a real estate vacancy posting to the second server via the completed form.

7. The method of claim 1, the method further comprising creating the form based upon an identified set of third-party systems stored in the database.

8. The method of claim 7, wherein the identified set of third-party systems is a default set.

9. The method of claim 7, wherein the identified set of third-party systems are identified responsive to a selection by an account user.

10. The method of claim 7, wherein the identified set of third-party systems comprises the first third-party system and the second-third party system.

11. The method of claim 1, wherein the received completed form comprises at least one incomplete field.

12. The method of claim 1, the method further comprising:

communicating, by the first server, with the first third-party system and with the second third-party system;

determining, based upon the communication, the requirements for the first third-party system and the requirements for the second third-party system; and creating the form based upon the determined requirements for the first third-party system and the determined requirements for the second third-party system.

13. The method of claim 1, the method further comprising:

retrieving, by the first server, a third-party form from a third-party system; and creating the form for transmittal to the client based upon the retrieved third-party form and according to a style specific to an account associated with the client.

14. The system of claim 4, wherein the processor creates the form based upon an identified set of third-party systems stored in the database.

15. The system of claim 14, wherein the identified set of third-party systems is a default set.

16. The system of claim 14, wherein the identified set of third-party systems are identified responsive to a selection by an account user.

17. The system of claim 14, wherein the identified set of third-party systems comprises the first third-party system and the second-third party system.

18. The system of claim 4, wherein the received completed form comprises at least one incomplete field.

19. The system of claim 4, wherein the processor:

communicates, via the transceiver, with the first third-party system and with the second third-party system;

determines, based upon the communication, the requirements for the first third-party system and the requirements for the second third-party system; and creates the form based upon the determined requirements for the first third-party system and the determined requirements for the second third-party system.

20. The system of claim 4, wherein the processor:

retrieves, via the transceiver, a third-party form from a third-party system; and creates the form for transmittal to the client based upon the retrieved third-party form and according to a style specific to an account associated with the client.

* * * * *